United States Patent [19]

Bresciani

[11] Patent Number: 5,162,474

[45] Date of Patent: Nov. 10, 1992

[54] SYNTHETIC THICKENERS, OBTAINED BY WATER-IN-OIL EMULSION POLYMERIZATION, HAVING IMPROVED CHARACTERISTICS FOR THE USE IN TEXTILE PRINTING

[75] Inventor: Angelo Bresciani, Bergamo, Italy

[73] Assignee: Sigma Prodotti Chimici S.p.A., Milan, Italy

[21] Appl. No.: 459,688

[22] Filed: Jan. 2, 1990

[30] Foreign Application Priority Data

Jan. 26, 1989 [IT] Italy .................................. 19192 A/89

[51] Int. Cl.⁵ ...................... C08F 20/06; C08F 20/54
[52] U.S. Cl. ................................. 526/306; 526/317.1
[58] Field of Search ............................ 526/317.1, 306

[56] References Cited

U.S. PATENT DOCUMENTS 3,493,500  2/1970  Volk et al. ................. 526/317.1
3,509,114  4/1970  Ballast ....................... 526/317.1

FOREIGN PATENT DOCUMENTS 3221284  12/1983  Fed. Rep. of Germany ... 526/317.1
1206711   9/1970  United Kingdom ............. 526/317.1

Primary Examiner—Joseph L. Schofer
Assistant Examiner—N. Sarofim
Attorney, Agent, or Firm—Griffin, Branigan & Butler

[57] ABSTRACT

The preparation and use of water-soluble or water-swellable copolymers by polymerization in water-in-oil emulsions of an olephinically unsaturated acid, a salt thereof, a multifunctional monomer, acrylonitrile and optionally a monomer with hydrophilic functional groups.

8 Claims, No Drawings

SYNTHETIC THICKENERS, OBTAINED BY WATER-IN-OIL EMULSION POLYMERIZATION, HAVING IMPROVED CHARACTERISTICS FOR THE USE IN TEXTILE PRINTING

Natural and, more recently, synthetic thickeners, are widely used in textile printing. The synthetic thickners are obtained by copolymerizing, according to different methods, unsaturated olephinic acids with a multifunctional unsaturated monomer as a curing agent.

These copolymers, dispersed in water, give rise to microgels. The microgels swell remarkably after neutralization with an organic or inorganic base and are therefore suited for use as a thickener in aqueous medium or in polar solvents.

They may be obtained in form of very fine powder requiring, for their use in the industrial practice, a further work-up in order to make their use more easy (said work-up consisting in the dispersion in an organic vehicle so as to obtain a suspension) or they may directly be obtained in form of oil-suspension by polymerizing according to the method of the "water-in-oil" polymerization, also known as reverse phase polymerization, as disclosed in EP-A-161038.

Whichever preparation method is used, said copolymers alone are not able to impart to the printing paste all the necessary characteristics, particularly when textiles mainly consisting of hydrophilic synthetic fibers are to be printed, such as polyester-cotton textiles with high polyester content, where the problem of the contour sharpness, known as "flushing" or "bleeding" is particularly important.

Although the problem of contour sharpness is less pronounced for the polymers obtained by reverse phase polymerization (EP-A-161038), nevertheless they also ask for additives to avoid flushing, as it is reported in EP-A-190002.

Another common feature of said polymer is that of a considerable loss of their thickening activity in the presence of electrolytes. In order to overcome the problem of the contour sharpness, the printing pastes are formulated with additives which are generally hydrosoluble polymers of different kind having low or relatively low molecular weight.

Said additions however have a more or less negative influence on other printing characteristics and particular brightness, resistance to washings and softness of the printed textile in the pigment printing.

It is therefore evident that a thickener able to impart alone to the printing pastes a good contour sharpness involves a considerable improvement for the thickeners used in the textile printing.

It has now been found that by carrying out a reverse phase polymerization with an olephinically unsaturated acid and a salt thereof, a multifunctional unsaturated monomer, an unsaturated monomer (preferably acrylonitrile) and optionally a monomer having hydrophylic functional groups, it is possible to obtain a copolymer meeting the contour sharpness requirement in printing pastes wherein it is used and exhibits moreover a remarkably improved resistance to electrolytes.

In the preparation of said copolymer, the presence of the unsaturated nitrile (preferably acrylonitrile) is essential in order to obtain resistance to bleeding without prejudicating the other printing characteristics.

Olephinically unsaturated acids, which may be used, are all the organic compounds containing a double bond and at least a carboxy group. Examples of said compounds are acrylic, metacrylic, crotonic, itaconic, maleic acids and mixtures thereof.

The definition of olephinically unsaturated acid should be understood to comprise also the anhydrides of the above acids, with the proviso that said anhydrides derive from a dicarboxylic acid after elimination of a water molecule between two carboxy groups of the same molecule.

The salts of said acids may derive from organic or inorganic bases.

As multifunctional unsaturated monomers all the compounds having at least two double bonds and which are soluble in water in the used amount or which are soluble in the monomeric mixture may be used. Suitable examples are allyl(met)acrylate, glycoldi(met)acrylate, methylenebisacrylamide. The used amount is generally lower than 1% in respect to the total monomers.

Monomers with hydrophilic groups which may be used are for instance acrylamide, metacrylamide, hydroxyethylacrylate, hydroxyethylmetacrylate, hydroxypropylacrylate, hydroxypropylmetacrylate and mixtures thereof.

The water-in-oil emulsion polymerization consists in dispersing in an organic medium, suitably added with an oleosoluble surfactant and optionally added with a polymeric stabilizer such as that disclosed in US 3691124, the monomers mixture dissolved in water.

The dispersion is carried out by an homogenizer which emulsifies the aqueous mixture in the organic vehicle, generally consisting of an high boiling hydrocarbon.

A water-in-oil emulsion is obtained, which, after removal of oxygen by nitrogen stream, is catalyzed with an hydrosoluble polymerization primer able to yield free radicals.

Polimerization primers may be peracids, persalts, hydroperoxides, used alone or in other systems. The polymerization occurs within a few hours. Once the polymerization is complete, the water is azeotropically eliminated and a final product as a suspension of the finely dispersed polymer in high-boiling hydrocarbon is obtained.

The polymerization is carried out in an inert medium at reduced pressure, normal pressure or under pressure.

The following non-limitative examples further illustrate the invention.

EXAMPLE 1

127 g of water, 83 g of acrylic acid, 12 g of acrylamide and 5 g of acrylonitrile are mixed in a three-neck flask with condenser and stirrer.

An ammonia solution is dropped up to pH=6.5, taking care that temperature does not exceed 25° C. The final weight of the resulting solution is 297 g. 2.8 g of a 1% methylenebisacrylamide solution, 0.07 g of 40% pentasodium salt of diethylenetriammino pentaacetic acid and 0.03 g of 2,2'-azobis(2-amidinopropane)hydrochloride are added thereto.

Separately the oily phase is prepared which consisted of 47 g of paraffin oil, 10.5 g of sorbitan-monooleate, 145 g of n-octane and 9 g of polymer stabilizer. The aqueous solution is emulsionated with a suitable apparatus in the organic phase, whereafter the mixture is transferred into a reactor having a stirrer and condenser and the oxygen is removed by a nitrogen stream.

3.5 g of a 1% t-butyl-hydroperoxide water solution are added thereto and 3.5 g of a 1% sodium bisulfite water solution, so as to keep the temperature from 40° to 50° C.

The polymerization is complete within 3 hours, whereafter water and then n-octane are azeotropically removed. 178.55 g are obtained which are added with 3% nonylphenol ethoxylated with 7 mols of ethylene oxide.

The following solution is prepared: 98.2 g of tap water, 1.5 g of the above suspension, 0.3 g of 26% ammonia. The viscosity, measured with Brookfield apparatus at 20 rpm at 20° C., is 25.000 cps. 0.1% of sodium sulfate is added to the solution and the viscosity is measured again, which is 15.000 cps.

EXAMPLE 2

A polymerization is carried out as in Example 1, but using 84.5 g of acrylic acid, 12 g of acrylamide, 2.75 g of acrylonitrile, with the same amounts of curing agent of the Example 1.

The viscosity is measured as in Example 1. It was 26.250 cps; after addition of 0.1% sodium sulfate, it was 13.400 cps.

EXAMPLE 3

A polymerization is carried out as in Example 1, but using 87.5 g of acrylic acid and 12.5 of acrylamide and with the same amount of curing agent. The yield is practically equivalent to that of Example 1. The viscosity is measured as in Example 1. It was 38.000 cps; after addition of 0.1% of sodium sulfate, it was 9.000 cps.

EXAMPLE 4

A polymerization is carried out as in Example 1, but using 100 g of acrylic acid and with the same amount of curing agent of the Example 1. The viscosity was 29.000; after addition of 0.1% of sodium sulfate, it was 8.200 cps.

EXAMPLE 5

A series of printing pastes containing 12% of curing acrylic latex, 1% of melanine resin, 0.2% of antifoam agent, 3% of Halizarin Blau RT$^R$ (BASF) was formulated with different amounts of thickeners of Examples 1-4 so as to have an apparent viscosity of 16.000 cps (Brookfield Viscosimeter RVT 20 rpm, 20° C.); the remaining part being tap water.

These printing pastes were used to print a 65/35 polyester-cotton textile by means of a laboratory printing machine. After the printing, the textile was left in the air for 120" and then dried at 150° C. for 150". Only the pastes formulated according to examples 1 and 2 are able to give prints endowed with very good contour sharpness and colour appearance.

I claim:

1. Synthetic thickeners obtained by copolymerising the following in water-in-oil emulsion:
   (a) an olephinically unsaturated acid,
   (b) a salt thereof,
   (c) a multifunctional monomer, and,
   (d) an olephinically unsaturated monomer having a nitrile group.

2. Synthetic thickeners according to claim 1, characterized in that the olephinically unsaturated monomer having a nitrile group is acrylonitrile.

3. Synthetic thickeners according to claim 2, characterized in that the used acrylonitrile is used in 0.2–20% by weight ratio in comparison to the total amount of monomers.

4. Synthetic thickeners according to claim 1, characterized in that the olephinically unsaturated acid is acrylic acid.

5. Synthetic thickeners according to claim 1, obtained by copolymerization of acrylic acid, ammonium acrylate, methylenebisacrylamide, acrylonitrile and acrylamide.

6. Thickener aqueous compositions comprising the synthetic thickeners of claim 1.

7. Printing pastes obtained from the synthetic pastes of claim 1.

8. Synthetic thickeners according to claim 1 obtained by also copolymerising in said water-in-oil emulsion an olephinically unsaturated monomer having hydrophilic functional groups.

* * * * *